(12) United States Patent
Koba et al.

(10) Patent No.: US 6,914,186 B2
(45) Date of Patent: Jul. 5, 2005

(54) WORKING-FLUID STORING DEVICE OF ELECTRIC DISCHARGE MACHINING APPARATUS

(75) Inventors: Ryogo Koba, Tokyo (JP); Akihito Adachi, Tokyo (JP); Toshio Suzuki, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 339 days.

(21) Appl. No.: 10/240,930

(22) PCT Filed: Feb. 14, 2001

(86) PCT No.: PCT/JP01/01035

§ 371 (c)(1),
(2), (4) Date: Oct. 7, 2002

(87) PCT Pub. No.: WO02/064298

PCT Pub. Date: Aug. 22, 2002

(65) Prior Publication Data

US 2004/0045732 A1  Mar. 11, 2004

(51) Int. Cl.$^7$ ................................................ H01J 15/00
(52) U.S. Cl. ............................. 174/50; 174/58; 174/60; 174/17 CT; 439/535; 312/216
(58) Field of Search .......................... 174/50, 58, 63, 174/17 CT, 60; 220/4.02, 3.8; 248/906; 439/535; 312/216, 100

(56) References Cited

U.S. PATENT DOCUMENTS

| | | | | |
|---|---|---|---|---|
| 5,501,243 A | * | 3/1996 | Palazzo | 137/15.08 |
| 5,783,775 A | * | 7/1998 | Marusinec | 174/50 |
| 5,901,868 A | * | 5/1999 | Fahey et al. | 220/4.02 |
| 6,039,123 A | * | 3/2000 | Webb | 169/45 |
| 6,770,810 B2 | * | 8/2004 | Wiebe et al. | 174/50 |

FOREIGN PATENT DOCUMENTS

| | | |
|---|---|---|
| JP | 62-259716 | 11/1987 |
| JP | 3-287312 | 12/1991 |
| JP | 8-71850 | 3/1996 |

* cited by examiner

Primary Examiner—Dhiru R. Patel
(74) Attorney, Agent, or Firm—Sughrue Mion, PLLC

(57) ABSTRACT

A work liquid storage apparatus of an electric discharge machine having a work tank (2) for storing a work liquid (5) supplied by work liquid supply (6) with a workpiece (4) placed in the work liquid (5), the work tank having an opening (2a), a door (12) for opening and closing the opening (2a), and a seal member (10) for hermetically sealing space between the work tank (2) and the door (12) includes support plates (13) each being formed with a long hole (13a) in an up and down direction, fixing (14) for fixing the support plates (13) and the door (12), and arms (15) each being rotatably supported at both end parts with the work tank (2) and the support plate (13). Since the door (12) can be held at the position covering the lower end part of the opening (2a) of the work tank (2) and the position exposing the lower end part of the opening (2a), maintenance work and replacement work of the seal member (10) can be performed easily.

7 Claims, 7 Drawing Sheets

WORKING-FLUID STORING DEVICE OF ELECTRIC DISCHARGE MACHINING APPARATUS

TECHNICAL FIELD

This invention relates to an improvement in a work liquid storage apparatus of an electric discharge machine, used with an electric discharge machine for producing electric discharge in the interpole part between an electrode and a workpiece in a work liquid. The work liquid storage apparatus stores the work liquid in a work tank and immerses the electrode and the workpiece in the work liquid.

BACKGROUND ART

FIG. 4 is a schematic representation to show the constitution of a work liquid storage apparatus of an electric discharge machine in a related art. In the figure, numeral 1 denotes a base, numeral 2 denotes a work tank placed on the base 1, numeral 3 denotes a work table installed in the work tank 2, numeral 4 denotes a workpiece fixed to the top of the work table 3, numeral 5 denotes an insulating work liquid, numeral 6 denotes work liquid supply means, and numeral 7 denotes an electrode. The work liquid 5 is supplied by the work liquid supply means 6 to the work tank 2 for storage therein. In FIG. 4, piping between the work tank 2 and the work liquid supply means 6, etc., is omitted. Numeral 2a denotes an opening made in the work tank 2 to facilitate installation of the workpiece 4, etc. Numeral 8 denotes a door for shielding the opening 2a and numeral 9 denotes a clamp for fixing the door 8 to the work tank 2.

FIG. 5 is a plan view to show the constitution around the work tank 2 of the work liquid storage apparatus of the electric discharge machine in the related art. Parts identical with or corresponding to those in FIG. 4 are denoted by the same reference numerals in FIG. 5. In FIG. 5, numeral 10 denotes a seal member of rubber, etc., for preventing the work liquid 5 from leaking and the seal member is fixed to the work tank 2 or the door 8.

During machining, the work liquid 5 is supplied to the work tank 2 by the work liquid supply means 6 for the tank to be filled therewith. At the time, the opening 2a of the work tank 2 is shielded by the door 8 and the door is pressed in the direction of the work tank 2 with the clamp 9 for crushing the seal member 10, thereby preventing the work liquid 5 from leaking.

Electric discharge machining proceeds as work power is supplied by a power supply unit not shown to the interpole part between the workpiece 4 and the electrode 7 immersed in the work liquid 5 in the work tank 2 and the surface of the workpiece 4 is melted and removed by interpole electric discharge energy. It is desirable that the seal member 10 should be cleaned on a day-to-day basis because the seal member 10 is made dirty with sludge, etc., occurring as electric discharge machining is performed and a flaw, etc., may occur on the seal member 10 because of repeated use of the seal member 10 in a dirty condition, hindering the seal function. If a flaw occurs actually on the seal member 10, the seal member 10 must be replaced promptly.

When the worker detaches the workpiece 4 from the work table 3 and takes out the workpiece 4 from inside of the work tank 2 after termination of electric discharge machining, the work liquid 5 is drained from the inside of the work tank 2 into the work liquid supply means 6 and the door 8 is opened, thereby opening the opening 2a of the work tank 2 and facilitating taking out the workpiece 4. FIGS. 6(a) and 6(b) are schematic representations to show an example of the opening and closing operation of the door 8 of the work tank 2 in the work liquid storage apparatus of the electric discharge machine in the related art. FIG. 6(a) shows the closed state of the door 8 and FIG. 6(b) shows the open state of the door 8. In FIGS. 6, numeral 11 denotes an arm supported at both end parts for rotation with the work tank 2 and the door 8. The arms 11 are operated from FIG. 6(a) to (b), whereby the door 8 can be placed in the open state from the closed state.

The door 8 in the open state in FIG. 6(b) is held at a position covering the vicinity of the lower end part of the opening 2a dirty with sludge, etc., occurring as electric discharge machining is performed so as not to make clothing, etc., of the worker dirty.

In the described work liquid storage apparatus of the electric discharge machine in the related art, as shown in FIG. 7, the seal member 10 can be exposed only if the whole door 8 is removed and is detached from the opening 2a by separating the rotation parts of the door 8 and the arms 11 end parts, for example. Thus, it is hard to clean the seal member 10 on a day-to-day basis and maintenance of the seal member 10 is left undone, resulting in a problem of shortening the life of the seal member 10.

When it becomes necessary to replace the seal member 10, the whole door 8 needs also to be removed as shown in FIG. 7.

The work of removing the whole door 8 and detaching the door 8 from the opening 2a as described above needs to be commissioned to a trained service expert trader, for example, because of handling heavy goods, and thus there is a problem of a rise in the cost taken in maintenance and replacement work of the seal member 10.

DISCLOSURE OF THE INVENTION

The invention is intended for solving the problems as described above and it is an object of the invention to provide a work liquid storage apparatus of an electric discharge machine for enabling the worker to easily perform maintenance work and replacement work of a seal member.

According to the invention, there is provided a work liquid storage apparatus of an electric discharge machine being formed with an opening in a work tank wherein a workpiece is placed for storing a work liquid supplied from work liquid supply means to facilitate installation of the workpiece, etc., and having a door for opening and closing the opening and a seal member for hermetically sealing space between the work tank and the door, and being provided with door opening and closing means being capable of holding the door at the position covering the lower end part of the opening and the position exposing the lower end part of the opening.

In the work liquid storage apparatus of an electric discharge machine according to the invention, the door opening and closing means comprises support means for supporting the door and being capable of changing a relative position to the door in an up and down direction and arms being supported at both end parts for rotation with the work tank and the support means.

In the work liquid storage apparatus of an electric discharge machine according to the invention, the door opening and closing means comprises support means for supporting the door and being capable of changing a relative position to the door in an up and down direction and linear drive means being capable of changing a relative position between the work tank and the door in the up and down direction.

In the work liquid storage apparatus of an electric discharge machine according to the invention, the support means comprises a support plate being formed with a hole long in the up and down direction and fixing means for fixing this support plate and the door.

In the work liquid storage apparatus of an electric discharge machine according to the invention, the door opening and closing means comprises linear drive means being capable of changing a relative position between the work tank and the door in an up and down direction.

In the work liquid storage apparatus of an electric discharge machine according to the invention, the linear drive means comprises a cylinder driven by a control fluid and a damper of a predetermined length being formed attachably to and detachably from a rod of the cylinder.

In the work liquid storage apparatus of an electric discharge machine according to the invention, the linear drive means comprises a cylinder driven by a control fluid, a brake for fixing the rod position of this cylinder, and drive control means for this brake.

Since the work liquid storage apparatus of an electric discharge machine according to the invention is thus configured, maintenance work and replacement work of the seal member can be performed easily, so that the cost taken for the maintenance work and replacement work of the seal member can be decreased.

BRIEF DESCRIPTION OF DRAWINGS

In the accompanying drawings.

BEST MODE FOR CARRYING OUT THE INVENTION

First Embodiment

Figure 1:
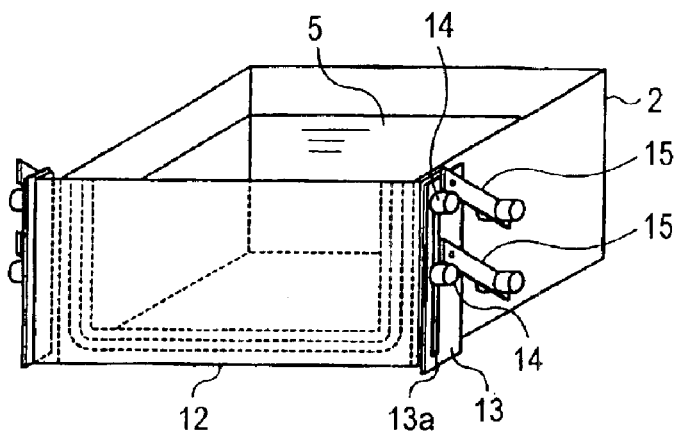
FIGS. 1(a) through 1(c) are schematic representations of the constitution and the operation around a work tank of a work liquid storage apparatus of an electric discharge machine according to a first embodiment of the invention.
Figure 1:
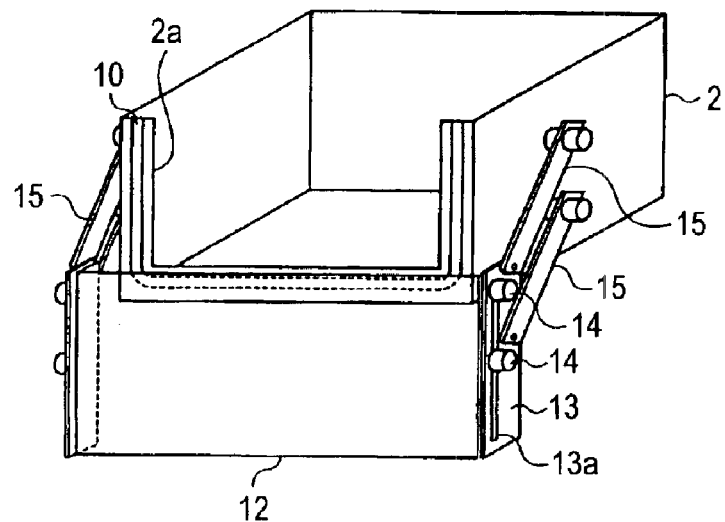
Figure 1:
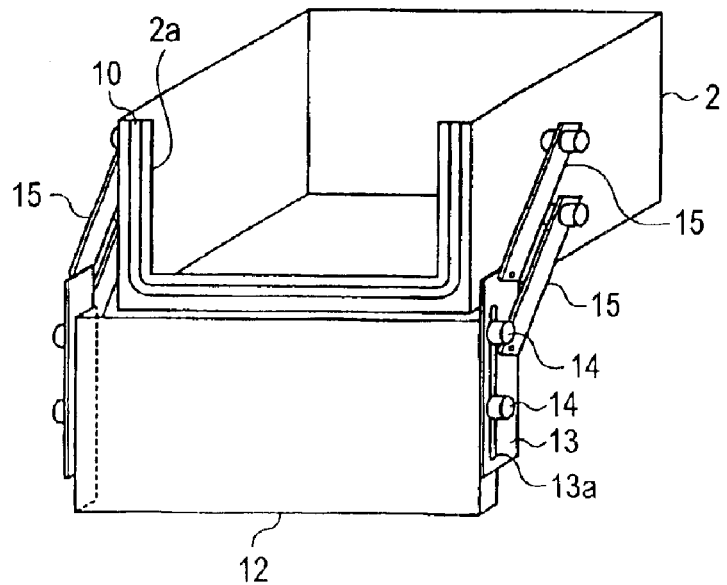
Figure 4:
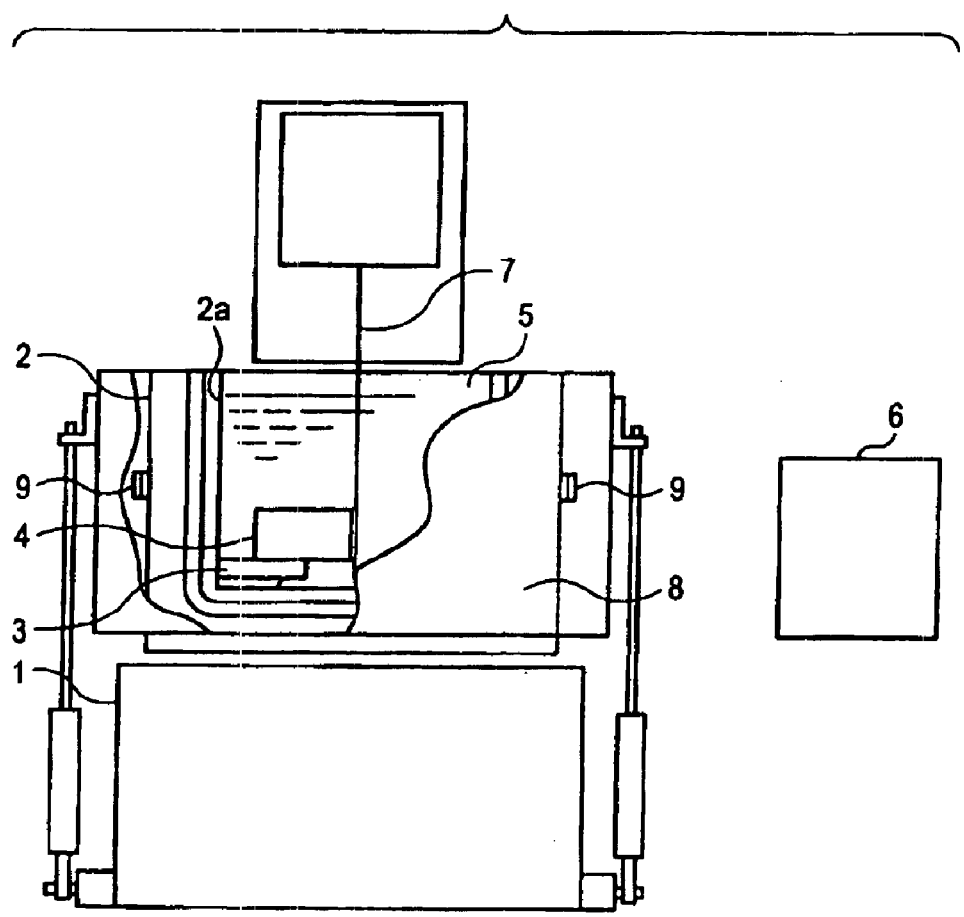
FIG. 4 is a schematic representation to show the constitution of a work liquid storage apparatus of an electric discharge in a related art.
Figure 5:
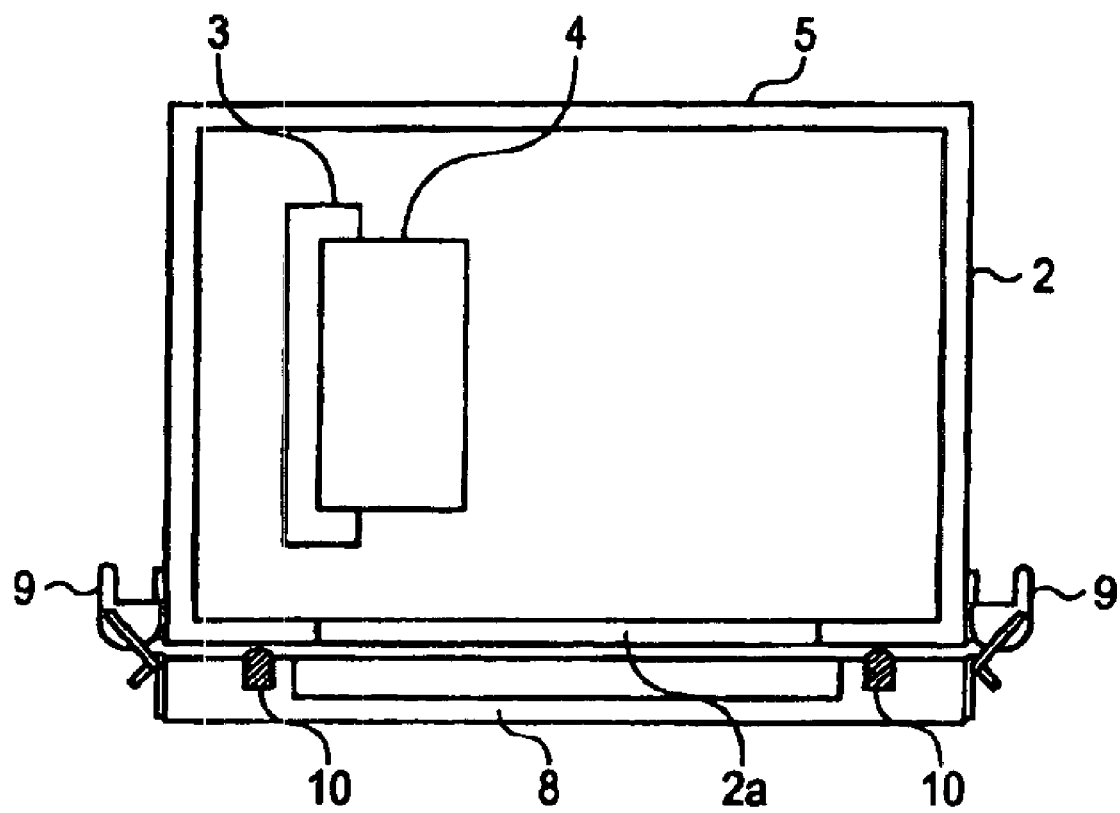
FIG. 5 is a plan view to show the constitution around a work liquid storage apparatus of the electric discharge machine in the related art.

FIG. 1 is a schematic representation of the constitution and the operation around a work tank of a work liquid storage apparatus of an electric discharge machine according to a first embodiment of the invention. The constitution, etc., of a work table placed on a work tank, a workpiece, and work liquid supply means is similar to that in FIG. 4 in Background of the Invention and therefore is omitted.

In FIG. 1, numeral 2 denotes a work tank, numeral 2a denotes an opening made in the work tank 2 to facilitate installation of a workpiece, etc., numeral 5 denotes a work liquid stored in the work tank 2, numeral 10 denotes a seal member attached to the work tank 2 along the opening 2a, numeral 12 denotes a door for shielding the opening 2a, numeral 13 denotes a support plate, and numeral 14 denotes fixing means of a bolt, etc., for example. Numeral 15 denotes an arm supported at both end parts for rotation with the work tank 2 and the support plates 13, and the arms 15 are driven manually or by drive means not shown. The arms 15, the support plates 13, the fixing means 14, and the like make up door opening and closing means. Since a long hole 13a long in an up and down direction is made in the support plate 13, the relative position of the door 12 to the plate support 13 can be changed in the up and down direction as the fixing positions by the fixing means 14 are changed.

Figure 6:
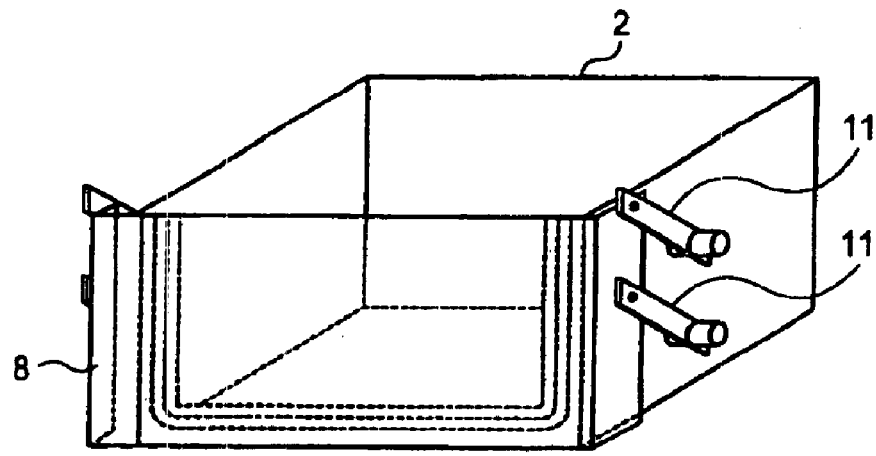
FIGS 6(a) and 6(b) are schematic representations to show an example of the opening and closing operation of a door of the work tank in the work liquid storage apparatus of the electric discharge machine in the related art.
Figure 6:
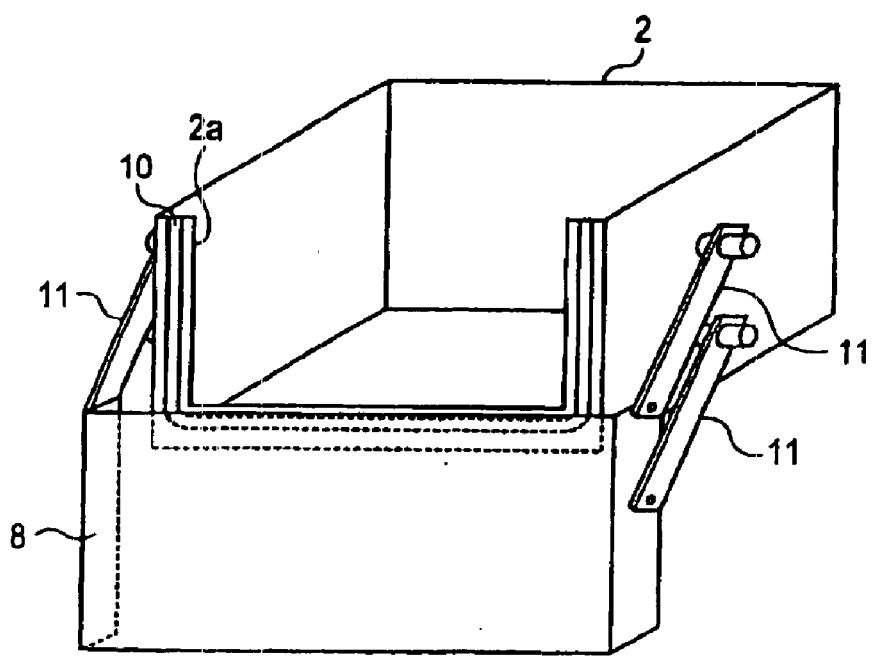
Figure 7:
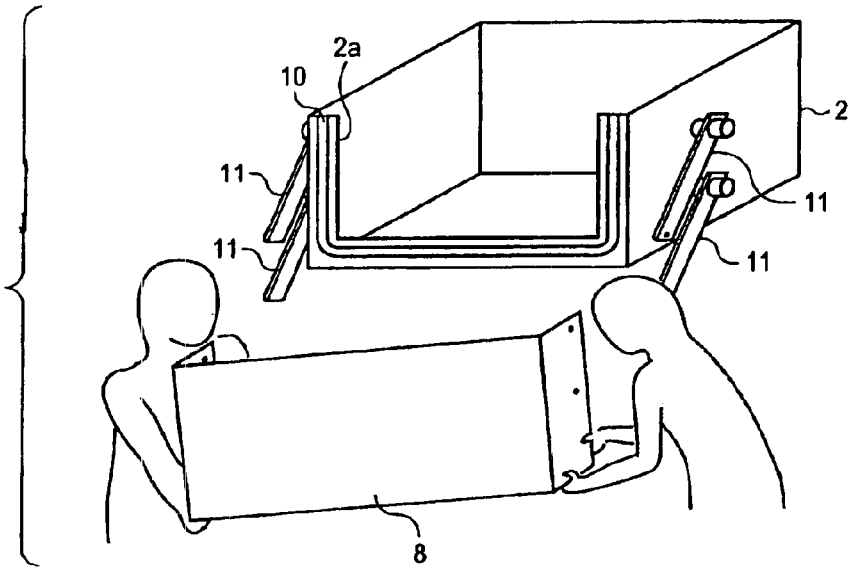
FIG. 7 is a schematic representation to show removal work of the door of the work tank in the work liquid storage apparatus of the electric discharge machine in the related art.

Next, the operation is as follows: In the state in FIG. 1(a), the work liquid 5 is discharged through a discharge port not shown and the arms 15 are operated as FIG. 1(a) to (b) show, whereby the door 12 is placed in the open state from the closed state (FIG. 1(b)). In the open state, the door is held at a position covering the vicinity of the lower end part of the opening 2a dirty with sludge, etc., occurring as electric discharge machining is performed as in FIG. 6 in Background of the Invention. Therefore, if the worker leans forward into the work tank 2, he or she does not touch the dirty seal member 10, etc., and clothing, etc., of the worker is not made dirty. The seal member 10 is not flawed either by a workpiece, etc., during arrangement work of installing the workpiece in the work tank 2 or work of taking out the workpiece from the work tank 2.

When the seal member 10 is cleaned or is replaced, fixing of the door 12 and the support plates 13 by the fixing means 14 is released and the door 12 is slid in the down direction relative to the support plates 13, as in FIG. 1(c). In this state, the seal member 10 is exposed, so that the seal member 10 can be cleaned and replaced easily.

According to the constitution of the work liquid storage apparatus of the electric discharge machine according to the first embodiment of the invention as described above, maintenance of the seal member 10 can be conducted properly and thus the life of the seal member 10 can be prolonged.

Since the whole door 12 need not be removed when the seal member is replaced, etc., the work need not be commissioned to a service expert trader and the worker himself or herself can replace the seal member 10 easily.

Therefore, the material, the work cost, etc., taken for replacing the seal member 10 can be decreased.

The case where the opening and closing operation of the door 12 from FIG. 1(a) to (b) or from FIG. 1(b) to (a) is performed using the arms 15 supported at both end parts for rotation with the work tank 2 and the support plates 13 has been described. However, to perform the opening and closing operation of the door 12, the door 12 and the work tank 2 may be supported linearly by a linear guide, etc., for example, and linear drive means of a linear motor, an air cylinder, etc., of an actuator for causing the door 12 to make a move relative to the work tank 2 linearly up and down may be used.

Second Embodiment

Figure 2:
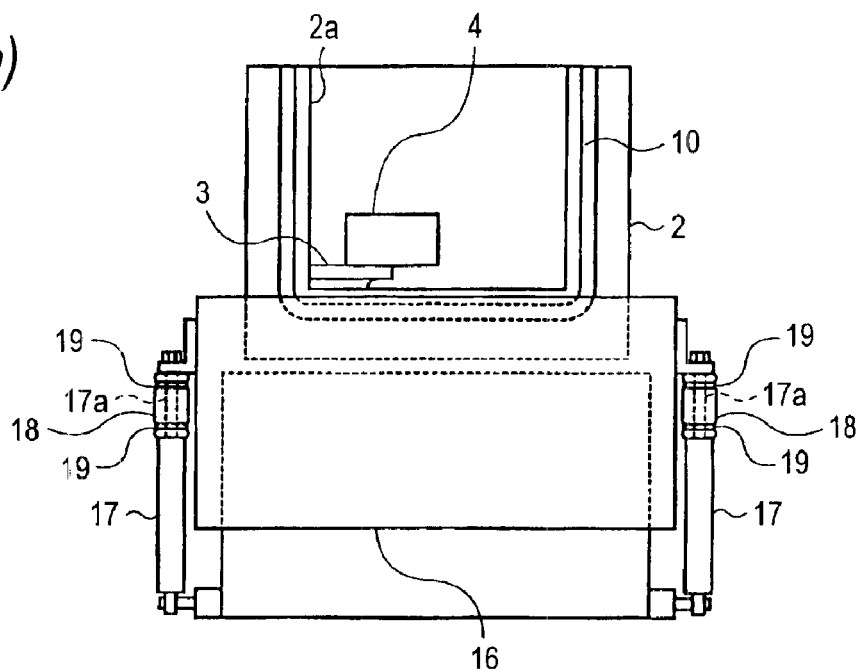
FIGS. 2(a) and 2(b) are schematic representations of the constitution and the operation around a work tank of a work liquid storage apparatus of an electric discharge machine according to a second embodiment of the invention.
Figure 2:
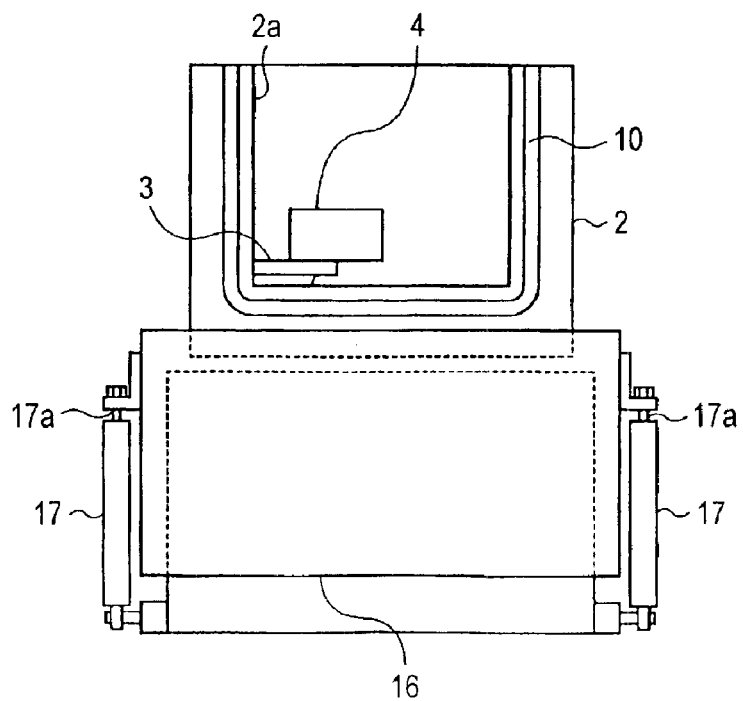

FIG. 2 is a schematic representation of the constitution and the operation around a work tank of a work liquid storage apparatus of an electric discharge machine according to a second embodiment of the invention. In the figure, numeral 2 denotes a work tank, numeral 2a denotes an opening made in the work tank 2 to facilitate installation of a workpiece, etc., numeral 3 denotes a work table installed in the work tank 2, numeral 4 denotes a workpiece fixed to the top of the work table 3, numeral 10 denotes a seal member attached to the work tank 2 along the opening 2a, numeral 16 denotes a door for shielding the opening 2a, numeral 17 denotes a cylinder of an actuator driven by a control fluid such as air pressure, etc., numeral 18 denotes a damper of a hard sponge, etc., and numeral 19 denotes a band for detachably attaching the damper 18 to a rod 17a of the cylinder 17. The cylinders 17, the dampers 18, the bands 19, etc., make up door opening and closing means.

Next, the operation is as follows: In FIG. 2, the door 16 is driven by the cylinders 17 in an up and down direction. If a control fluid enters the cylinders 17 in the direction of moving down the door 16, the cylinders 17 attempt to move down to the stroke end. However, as the damper 18 of a predetermined length is attached to the rod 17a of each cylinder 17 as in FIG. 2(a), each cylinder 17 can be stopped at a predetermined position (FIG. 2(a)). This state corresponds to FIG. 1(b) in the first embodiment.

The damper 18 can be easily detached from the rod 17a of the cylinder 17 by removing the band 19. As the damper 18 is detached from the rod 17a of the cylinder 17, the cylinder 17 moves to the stroke end, so that the seal member 10 can be exposed (FIG. 2(b)). This state corresponds to FIG. 1(c) in the first embodiment.

According to the constitution of the work liquid storage apparatus of the electric discharge machine according to the second embodiment of the invention as described above, the advantage similar to that of the first embodiment is provided.

In the description made above, the cylinders 17 are used to cause the door 16 to make a move relative to the work tank 2 linearly up and down, but any other linear drive means of a linear motor, etc., may be used.

Third Embodiment

Figure 3:
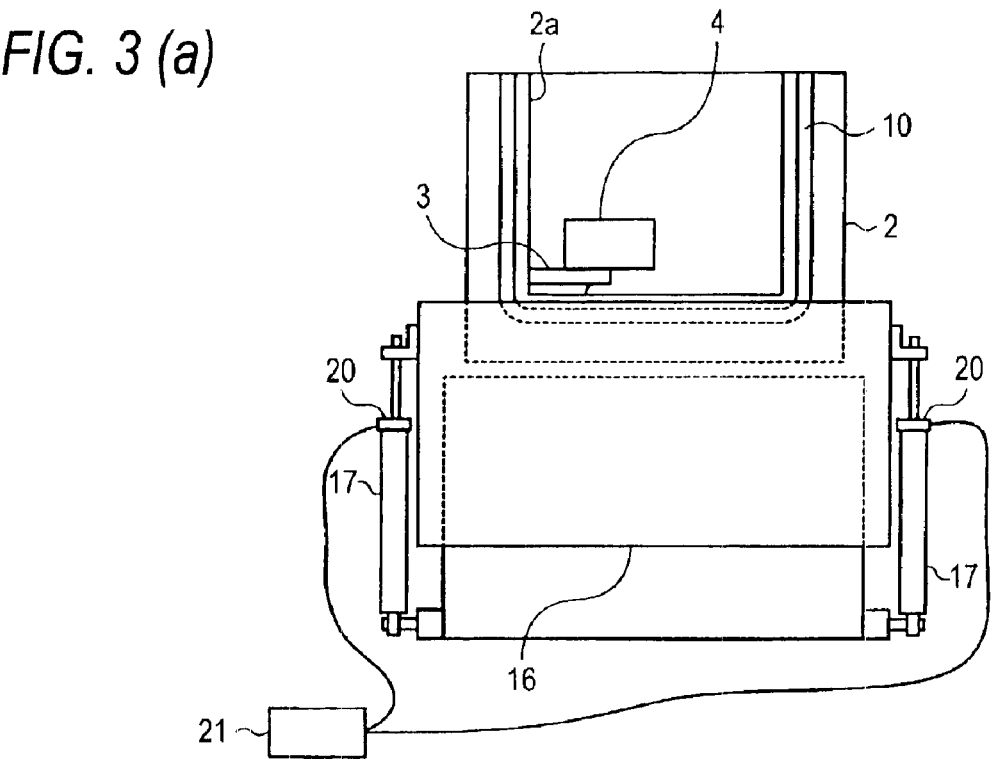
FIGS. 3(a) and 3(b) are schematic representations of the constitution and the operation around a work tank of a work liquid storage apparatus of an electric discharge machine according to a third embodiment of the invention.
Figure 3:
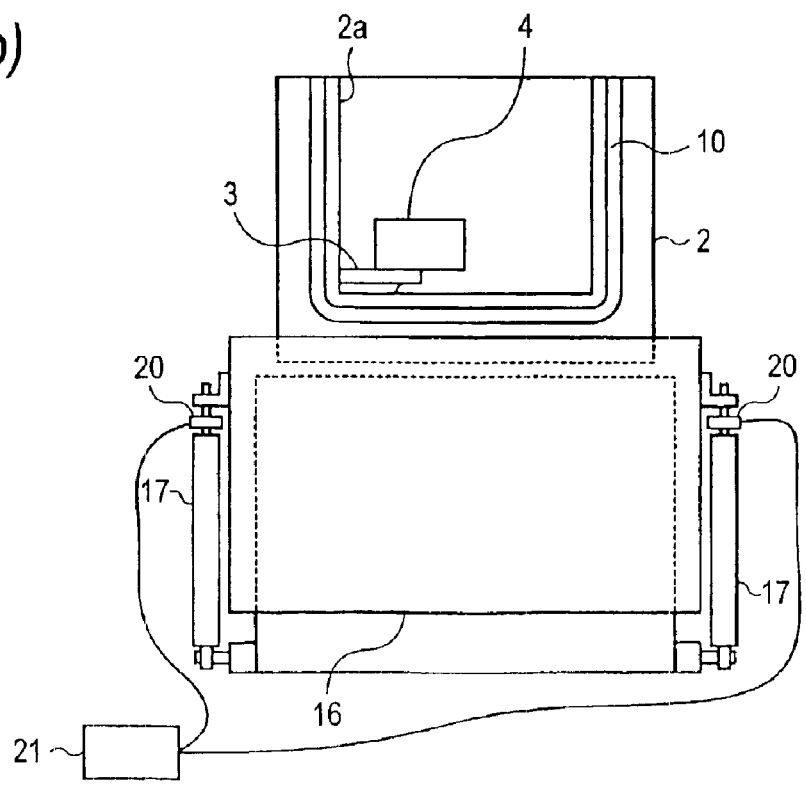

FIG. 3 is a schematic representation of the constitution and the operation around a work tank of a work liquid storage apparatus of an electric discharge machine according to a third embodiment of the invention. Parts identical with or similar to those in FIG. 2 in the second embodiment are denoted by the same reference numerals in FIG. 3. In FIG. 3, numeral 20 denotes a brake attached to a cylinder 17 and numeral 21 denotes drive control means of the breaks 20. The drive control means 21 controls driving the brakes 20 based on position data provided by position detection means not shown, whereby a door 16 can be held at a position as shown in FIG. 3(a) or (b), namely, at a position covering the lower end part of an opening 2a of a work tank 2 and a position exposing the lower end part of the opening 2a, so that the advantages similar to those of the first and second embodiments are provided.

In the work liquid storage apparatus of the electric discharge machine having the constitution in FIG. 3, the cylinders 17, the brakes 20, the drive control means 21, and the like make up door opening and closing means.

INDUSTRIAL APPLICABILITY

As described above, the work liquid storage apparatus of the electric discharge machine according to the invention enables the operator to easily perform maintenance work and replacement work of the seal member of the work tank and is suited for use with electric discharge machining work.

What is claimed is:

1. A work liquid storage apparatus of an electric discharge machine having a work tank for storing a work liquid supplied from work liquid supply means, the work tank being formed with an access opening, and having a door for opening and closing the access opening and a seal member for hermetically sealing a space between the work tank and the door, characterized by door opening and closing means being capable of holding the door at a position covering a lower end part of the access opening and a position exposing the lower end part of the access opening.

2. The work liquid storage apparatus of an electric discharge machine as claimed in claim 1 wherein the door opening and closing means comprises support means for supporting the door and being capable of changing a relative position to the door in an up and down direction and arms being supported at both end parts for rotation with the work tank and the support means.

3. The work liquid storage apparatus of an electric discharge machine as claimed in claim 1 wherein the door opening and closing means comprises support means for supporting the door and being capable of changing a relative position to the door in an up and down direction and linear drive means being capable of changing a relative position between the work tank and the door in the up and down direction.

4. The work liquid storage apparatus of an electric discharge machine as claimed in claim 2 or 3 wherein the support means comprises a support plate being formed with a hole long in the up and down direction and fixing means for fixing this support plate and the door.

5. The work liquid storage apparatus of an electric discharge machine as claimed in claim 1 wherein the door opening and closing means comprises linear drive means being capable of changing a relative position between the work tank and the door in an up and down direction.

6. The work liquid storage apparatus of an electric discharge machine as claimed in claim 5 wherein the linear drive means comprises a cylinder driven by a control fluid and a damper of a predetermined length being formed attachably to and detachably from a rod of the cylinder.

7. The work liquid storage apparatus of an electric discharge machine as claimed in claim 5 wherein the linear drive means comprises a cylinder driven by a control fluid, a brake for fixing a rod position of this cylinder, and drive control means for this brake.

* * * * *